(12) United States Patent
Jäck

(10) Patent No.: US 6,311,382 B1
(45) Date of Patent: Nov. 6, 2001

(54) METHOD FOR INSTALLING DOOR HINGES ON CAR BODIES, AND DEVICE FOR IMPLEMENTING SAME

(75) Inventor: Kurt Jäck, Aulendorf (DE)

(73) Assignee: Thyssen Krupp Technologies AG (DE)

( * ) Notice: Subject to any disclaimer, the term of this patent is extended or adjusted under 35 U.S.C. 154(b) by 0 days.

(21) Appl. No.: 09/462,057

(22) PCT Filed: Jun. 24, 1998

(86) PCT No.: PCT/EP98/03865

§ 371 Date: Dec. 28, 1999

§ 102(e) Date: Dec. 28, 1999

(87) PCT Pub. No.: WO99/07596

PCT Pub. Date: Feb. 18, 1999

(30) Foreign Application Priority Data

Aug. 7, 1997 (DE) .............................................. 197 34 157

(51) Int. Cl.⁷ ...................................................... G01B 5/14
(52) U.S. Cl. ........................ 29/464; 29/407.09; 29/281.5; 33/600; 33/783; 33/806; 33/809; 269/905
(58) Field of Search .................... 29/11, 407.05, 29/407.09, 407.01, 464, 714, 809, 281.1, 281.5; 33/600, 608, 783, 787, 806, 809; 269/905

(56) References Cited

U.S. PATENT DOCUMENTS

| | | | |
|---|---|---|---|
| 4,416,088 | * 11/1983 | Feucht et al. | 49/502 |
| 4,589,184 | * 5/1986 | Asano et al. | 29/407 |
| 4,625,416 | * 12/1986 | Ohtaki et al. | 29/709 |
| 4,736,515 | * 4/1988 | Catena | 29/714 |
| 4,981,400 | * 1/1991 | Stover | 33/667 |
| 5,740,598 | * 4/1998 | Sauve | 29/407.1 |
| 6,065,200 | * 5/2000 | Negre | 29/464 |
| 6,122,813 | * 9/2000 | Roy et al. | 29/407.09 |

FOREIGN PATENT DOCUMENTS

| | | |
|---|---|---|
| 33 42 570 | 6/1985 | (DE) . |
| 40 11 909 | 10/1991 | (DE) . |
| 0 470 939 | * 2/1992 | (EP) . |
| 0 685 622 | * 12/1995 | (EP) . |
| 2-258485 | 10/1990 | (JP) . |
| 08-039364 | * 2/1996 | (JP) . |

* cited by examiner

Primary Examiner—P. W. Echols
Assistant Examiner—Eric Compton
(74) Attorney, Agent, or Firm—McGlew and Tuttle, P.C.

(57) ABSTRACT

The invention relates to a method and a device for installing door hinges on car bodies, whereby the actual opening width of the car door on the side frame receiving one or two car doors in the longitudinal car axis is touch-sensitively determined by means of a sensor in a direction X and the arrangement of the door hinges is adjusted in said direction X using a positioning system connected to the sensor by a cranking device, depending on the tolerance margin, which should be calculated so as to have at least vertically (direction Z) as uniform a slot width as possible once the car door is mounted.

21 Claims, 4 Drawing Sheets

METHOD FOR INSTALLING DOOR HINGES ON CAR BODIES, AND DEVICE FOR IMPLEMENTING SAME

FIELD OF THE INVENTION

The present invention pertains to a process and a device for mounting the door hinges on motor vehicle bodies.

BACKGROUND OF THE INVENTION

A process for fastening a door on the body of a motor vehicle has been known from DE 33 42 570 C2, in which the bodies are cyclically conveyed at spaced locations from one another by an endless conveyor to a predetermined point and the door provided with two hinges fastened in different planes one on top of another is moved by an industrial robot in the correct position to the location of the hinge and fastened. The door is moved movably in space in an articulated manner, floatingly, against the opening provided for this purpose until a contact finger comes into contact with a point intended for this purpose. Simultaneously with the determination of the height of the hinges by touching, the angular position of the outwardly directed side wall of the hinge part in question in relation to the body is recognized, and both the values for the vertical height assignment of the hinges and the values for the angular position of the hinges are sent to a computer. The door hinges, already connected to the door, are then welded to the body by one or more welding robots independently from the values determined by touching stored in the computer. Inaccuracies due to the tolerances of the sensors and the robot technology may occur time and time again with this so-called sensor-guided robot technology. In addition, the subsequent assembly of the interior installations of the automobile may be hindered due to the door being mounted on the body at an early stage. It is therefore frequently desirable to fasten first only the door hinges on the door pillars of the body, possibly in the correct position, and to insert the door only later, possibly after the complete interior assembly.

A similar process has been known from JP 02-258 485 A, in which the width of the door opening is likewise measured with a plurality of measuring scanners and the position of the body is measured by means of an imaging camera, the measured values are acquired centrally, and the further installation of the door hinges is controlled by means of an NC machine.

DE 40 11 909 C3 describes a passenger car door, which has special three-dimensional joints at the hinges in order to simplify the mounting and removal. Contrary to the above-mentioned philosophy of assembly, according to which all inner parts must be introduced into the interior of the automobile through the doors already welded or bolted on, the doors themselves are mounted later by the completely painted doors assembled completely with the windows and window lifter mechanism being mounted on the door pillars only after the body has been outfitted. However, assembly by means of these three-dimensional joints, which have a relatively complicated design, is difficult and time-consuming because of the accurate positioning.

SUMMARY AND OBJECTS OF THE INVENTION

The primary object of the present invention is therefore to provide a process and a device for mounting the door hinges on motor vehicle bodies, in which the doors are likewise fastened to the door pillars after the interior assembly and the door hinges are fastened in the correct position with a simpler construction and in a shorter time.

According to the invention, a process is provided for mounting the door hinges on motor vehicle bodies. The width of the door opening of the side frame, which receives one or two doors, in the longitudinal direction of the vehicle (X direction) is determined by a scanner by touch. The arrangement of the door hinges is corrected by means of a positioning system connected to it via a lever mechanism as a function of the deviation in dimension in the X direction such that at least the vertical gaps will have a possibly uniform gap width at the door installed later and that only the door hinges are fastened first to the door pillars after a tensioning operation.

According to another aspect of the invention, a device is provided for mounting the door hinges on motor vehicle bodies for carrying out the process. The device has a flexible positioning system comprising a scanner for determining the width of the door opening of the side frame, wherein the scanner acts directly on the positioning system for correcting the measured tolerance deviation in the X direction via a said toothed rack and a lever mechanism. A mounting frame is provided, which can be actuated by a robot, with integrated carriages ($S_x$, $S_y$, $S_z$) displaceable in the X, Y and Z directions, on which the positioning system is displaceable in the X direction, and on which a joining and tensioning means for pneumatically pressing the said door hinges against the said door pillars and means are arranged for permanently fastening the door hinges to the door pillars by bolting and/or welding.

The actual width of the door opening is determined according to the present invention by touching, i.e., on each door, in the longitudinal direction of the vehicle (X direction) with a scanner acting mechanically in the X direction. This scanner is in turn directly connected mechanically to the positioning system for the door hinges via lever mechanisms. Depending on the deviation in dimension, the deviation in dimension in the X direction is then corrected automatically at a predetermined or settable conversion ratio of preferably 1:2 to 1:3 such that at least the vertical gap of the door installed later will have a possibly uniform width. After this correction, the door hinges are then braced with the door pillars in the known manner and preferably bolted thereto. The present invention is based on a flexible positioning system, wherein the actual width of the opening in the side frame of the body is determined by touching due to the displaceability in the X direction by means of an integrated carriage and, e.g., the arrangement of the so-called B pillar hinges for fastening the rear door is corrected corresponding to the width of the opening by half the tolerance deviation (in the plus or minus direction). As a result, an identical gap width is guaranteed between the front door and the rear door as well as between the rear door and the C pillar at least in the required tolerance range.

The flexible positioning system according to the present invention may be used both with robot technology and manually. The door hinges may be inserted into the positioning system manually or they may also be taken automatically by the positioning system from magazines.

The two door hinges of a door, arranged one on top of another, are preferably taken up for mounting by a common traverse, which is also mounted on an additional fulcrum point on the positioning system and/or on a mounting frame in order for the hinges to be able to be brought into contact with each door pillar on the transverse direction of the vehicle (Y direction) in a stress-free manner. This movement may also be performed both manually or automatically.

Furthermore, it has proved to be favorable, to compensate the door sagging caused by the weight of the door, to rotate the door hinges around a horizontal axis in the opposite direction by a corresponding, predetermined angle and then to fasten them to the door pillar. This angle of rotation is determined by a measured value determined after the subsequent mounting, which is taken into account already before the mounting of the door hinges. Integrated pneumatic compensating systems acting in the Y and Z directions have proved to be useful for positioning the mounting frame on the body to eliminate tolerance deviations between the mounting frame, the body and the robot.

The flexible positioning system according to the present invention comprises a scanner for determining the width of opening of the side frame, which ensures the correction of the measured tolerance deviation in the X direction via a toothed rack and a lever mechanism, a mounting frame that can be actuated by a robot with an integrated carriage displaceable in the X, Y and Z directions, on which the positioning system is also displaceable in the X direction, and on which joining and clamping means for pneumatically pressing the door hinges against the door pillars and means for permanently fastening the door hinges to the door pillars by bolting and/or welding are also arranged.

The mechanical scanner can be pressed by means of a spring or an especially pneumatically acting displacing cylinder against a measuring point of the door opening in the X direction, and the displacing cylinder and/or the contour unit act at the same time on the mechanism for setting the tolerance compensation via a toothed rack.

Rotating means with fulcrum points for compensating the door sagging may be additionally arranged according to the present invention on the mounting frame.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
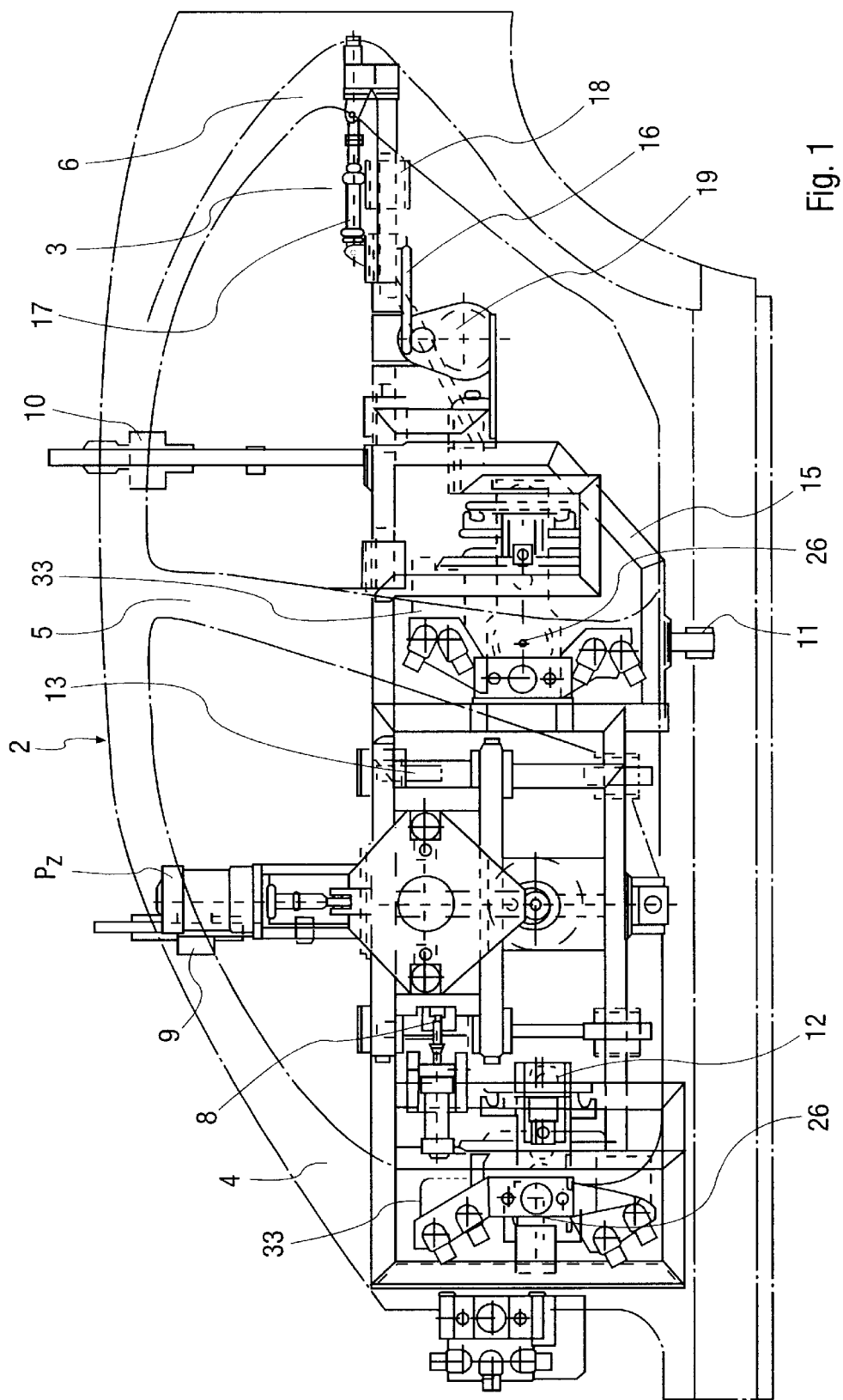
FIG. 1 is a side view of the mounting frame with the flexible positioning system according to the present invention.

After fastening the side frames 2 to the body, the door hinges 28 can be fastened to the door pillars 4 and 5. The present invention pertains especially to the fastening of two hinges 28 arranged one on top of another to the front door pillar 4 (A pillar) and to the middle door pillar 5 (B pillar) in a passenger car with four or five doors. To do so, a mounting frame 32 is fastened to a screw-down plate 1 of the robot arm of a robot, not shown, movably in the X, Y and Z directions, wherein corresponding carriages $S_x$, $S_y$ and $S_z$ can be moved by means of pneumatic cylinders $P_x$, $P_y$ and $P_z$. The mounting frame 32 is brought into contact with the side frame 2 in three points, namely, at the top on the roof frame unit 9 and the shim angle 10 and at the bottom at the contact piece 11. The door hinges 28 are held during mounting by grippers 33 fastened movably to the mounting frame 32 and by hinge supports 7 and 8 extending in the Y and X directions.

Figure 2:
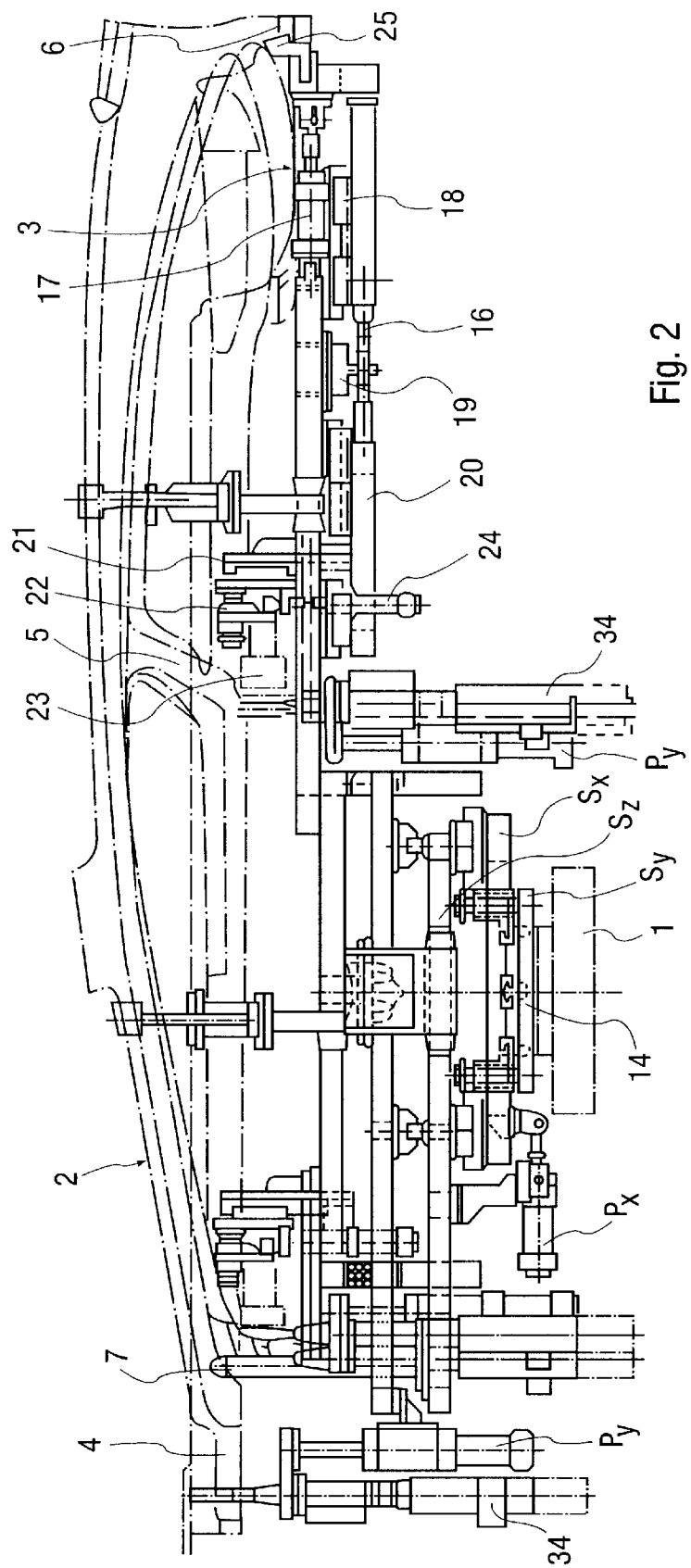
FIG. 2 is a top view of the device according to FIG. 1.

The device according to the present invention comprises, in particular, the scanner 3 acting in the X direction, which is pressed by the displacing cylinder 17 with its contour unit 25 against the door opening in the area of the C pillar 6. The displacing cylinder 17 is connected to a toothed rack 16, which is arranged movably in a linear guide 18 extending in the X direction. The toothed rack 16 directly cooperates with a lever mechanism 19 for setting the tolerance compensation. The positioning system according to the present invention is shown in FIGS. 1 and 2 for the setting during the mounting of the door hinges 28 for the rear side door. The lever mechanism 19 has a 1:2 conversion ratio for this, so that the guide frame 20 is automatically displaced by half the tolerance deviation measured at the contour unit 25 in the X direction together with the joining frame 21 for the hinge, the traverse 22 and the tensioner bracket 23. As a result, the same gap width is obtained according to the present invention in the area between the C pillar 6 and the rear door as well as between the two doors in the area of the B pillar 5 for the doors installed later. Due to the rigid connection according to the present invention via the mounting frame 32, the door hinges can also be positioned on the A pillar 4 as desired. However, as an alternative, the means 3, 16 through 25 according to the present invention may also be arranged for positioning the door hinges 28 on the A pillar 4 in the area of the front door between the A pillar 4 and the B pillar 5. Besides the means described for positioning in the correct position in the X direction, means may also be provided for compensating the sag of the doors occurring during the subsequent mounting of the doors due to their own weight. A turning plate 12 or a pendulum frame 15 is fastened for this purpose to the mounting frame 32 rotatably around the fulcrum point 26 to compensate the door sagging. In the representation according to FIGS. 1 and 2, the door hinges 28 can be rotated as a result counterclockwise by a predetermined angle, so that the desired, same distance will be obtained above and under the doors after the subsequent mounting of the door even if the own weight of the doors is taken into account. Major adjusting operations after the mounting of the doors can thus be eliminated.

Figure 3:
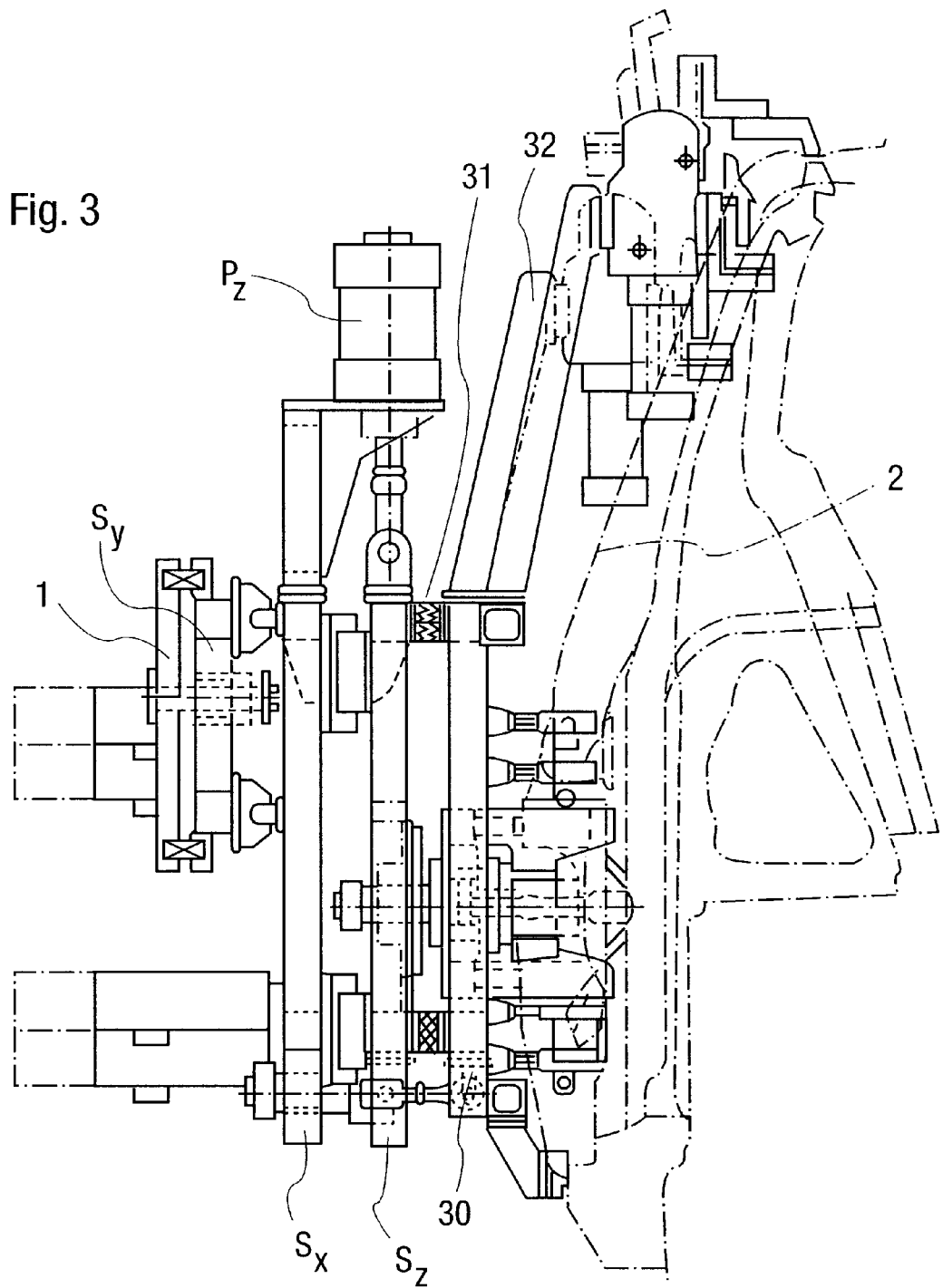
FIG. 3 is a sectional view along line C—C in FIG. 1.
Figure 5:
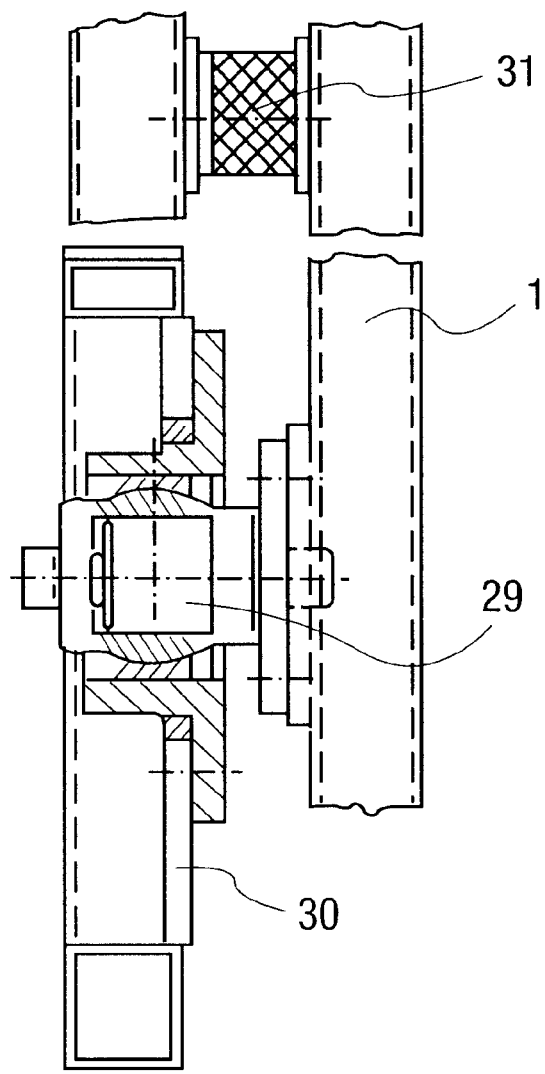
FIG. 5 is an enlarged representation of a section along line D—D in FIG. 1.

For positioning the mounting frame 32 on the body, pneumatic compensating systems in the Y and Z directions are integrated in order to eliminate tolerance accumulations between the mounting frame 32, the body and the robot. Reference is made in this connection to the guides 13 and 14 for the Z and Y compensation. As is apparent from FIG. 5 in conjunction with FIGS. 1 through 3, the mounting frame 32 may be fastened to the screw-down plate 1 of the robot arm via a spherical mount 29, a pendulum frame 30 and a rubber spring 31.

Figure 4:
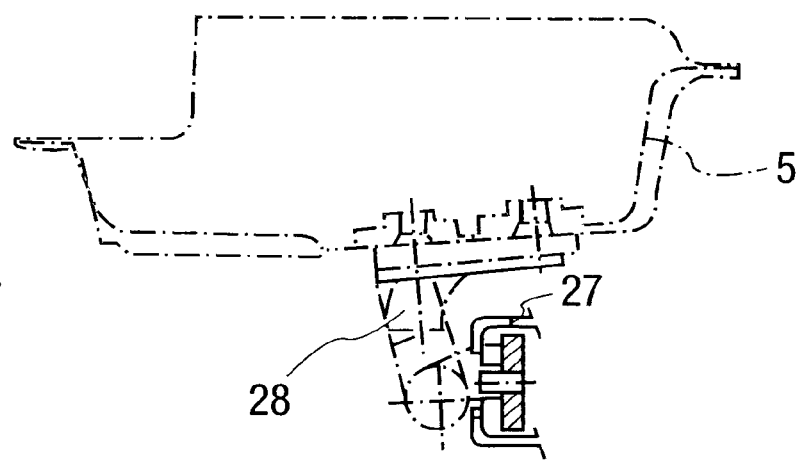
FIG. 4 is an enlarged representation of a horizontal section through the B pillar with the door hinge fastened thereto.

After the positioning according to the present invention, the door hinges 28 can be brought into their position on the door pillar 5 by means of, e.g., the displacing cylinder 24 and, according to FIG. 4, via the hinge tensioner 27, and be bolted thereto pneumatically or by means of an electric screwdriver 34. The bolts may be mounted on both the mounting frame 32 and rigidly before the corresponding bolt location. The bolt is fed in correspondingly.

While specific embodiments of the invention have been shown and described in detail to illustrate the application of the principles of the invention, it will be understood that the invention may be embodied otherwise without departing from such principles.

What is claimed is:

1. A process for mounting door hinges on motor vehicle bodies, the process comprising the steps of:

determining the width of a door opening in a side frame of a vehicle body, receiving one or two doors in the longitudinal direction of the vehicle, the X direction, by physically touching the door opening using a device with a scanner having a touch contour element touching a vehicle body end pillar at an extent of the opening;

positioning the door hinges in the door opening with a mechanical positioning system mechanically connected to said scanner via a lever mechanism, said positioning system changing the position of the door hinges in the X direction along another vehicle body pillar as a function of a deviation in dimension in the X direction of said door opening determined by said scanner by touching said vehicle body end pillar;

tensioning the door hinges after said step of changing the position;

fastening said door hinges to the door pillars after said step of tensioning; and attaching the door to the hinges after said step of fastening, said hinges being positioned before fastening and before attaching said doors such that at least a gap between each door and an adjacent structure will have a substantially uniform gap width.

2. The process in accordance with claim 1, wherein the door hinges are positioned via an adjustable lever mechanism in the X direction.

3. The process in accordance with claim 1, wherein said door opening is formed by a front A pillar a central B pillar and a vehicle end C pillar, the position of the hinges at said B pillar being displaced by half the deviation in the X direction for fastening a rear door to said hinges at said B pillar.

4. The process in accordance with claim 2, wherein said door opening is formed by a front A pillar a central B pillar and a vehicle end C pillar, the position of the hinges at said B pillar being displaced by half the deviation in the X direction for fastening a rear door to said hinges at said B pillar.

5. The process in accordance with claim 1, wherein the hinges of a door, which are arranged one on top of another, are taken up for mounting by a common traverse, the common traverse being fastened rotatably on one of said positioning system and a mounting frame, so that the hinges can be brought into contact with each door pillar in a stress-free manner.

6. The process in accordance with claim 2, wherein the hinges of a door, which are arranged one on top of another, are taken up for mounting by a common traverse, the common traverse being fastened rotatably on one of said positioning system and a mounting frame, so that the hinges can be brought into contact with each door pillar in a stress-free manner.

7. The process in accordance with claim 3, wherein the hinges of a door, which are arranged one on top of another, are taken up for mounting by a common traverse, the common traverse being fastened rotatably on one of said positioning system and a mounting frame, so that the hinges can be brought into contact with each door pillar in a stress-free manner.

8. The process in accordance with claim 1, further comprising the step of rotating the positioned door hinges, with the hinges arranged one on top of another in the opposite direction by a corresponding, predetermined angle around a horizontal axis to compensate door sagging caused by the weight of the door, said hinges being fastened to the door pillar subsequent to said step of rotating.

9. The process in accordance with claim 1, wherein the door hinges are automatically removed from magazines before or after the determination of the width of the door opening of the side frame by the positioning system, positioned before the functional surface of the door pillar, braced therewith pneumatically and subsequently fastened to the door pillar by bolting and/or welding.

10. A flexible positioning system device for mounting door hinges on motor vehicle bodies for determining the width of a door opening of a side frame of a vehicle body, receiving one or two doors in the longitudinal direction of the vehicle and correcting the arrangement of the door hinges, the device comprising:

a mechanical scanner with a touch contour element for touching an end vehicle body pillar for determining the longitudinal direction dimension of the door opening of the side frame;

a positioning system toothed rack and a lever mechanism, said scanner acting mechanically and directly on said positioning system for mechanically correcting a measured deviation of the door hinges in the door opening, in the longitudinal direction via a mechanical connection between said scanner and said toothed rack and lever mechanism;

a robot actuated mounting frame having integrated carriages displaceable in the X, Y and Z directions, said positioning system being displaceable in the longitudinal direction on said mounting frame;

a joining and tensioning device for pneumatically pressing the door hinges against the said door pillar said joining and tensioning device being arranged on said mounting frame and being displaceable with said positioning system to position the hinges along a longitudinal extent of a pillar of the vehicle body; and a device for permanently fastening the door hinges to the door pillars by bolting and/or welding.

11. The device in accordance with claim 10, further comprising a pneumatic compensating system for positioning the said mounting frame in the Y and Z directions.

12. The device in accordance with claim 10, further comprising a contour unit, wherein said scanner has a displacing cylinder acting in the X direction for pressing said contour unit against a measuring point of the door opening, and that the said displacing cylinder acts via a toothed rack on said toothed rack and lever mechanism for correcting the deviation.

13. The device in accordance with claim 11, further comprising a contour unit, wherein said scanner has a displacing cylinder acting in the X direction for pressing said contour unit against a measuring point of the door opening, and that the said displacing cylinder acts via a toothed rack on said toothed rack and a lever mechanism for correcting the deviation.

14. The device in accordance with claim 10, further comprising a rotating device having fulcrum points for compensating the door sagging, said rotating device being arranged on said mounting frame.

15. The device in accordance with claim 11, further comprising a rotating device having fulcrum points for compensating the door sagging, said rotating device being arranged on said mounting frame.

16. The device in accordance with claim 12, further comprising a rotating device having fulcrum points for compensating the door sagging, said rotating device being arranged on said mounting frame.

17. A process for mounting door hinges on a motor vehicle body, the process comprising the steps of:
   providing a vehicle body with a side frame having an opening with a front A pillar, a middle B pillar and an end C pillar;
   providing a robot actuated mounting frame having integrated carriages displaceable in the X, Y and Z directions, and also having a positioning system displaceable in the longitudinal direction on said mounting frame, the X direction being said longitudinal direction;
   physically touching the C pillar using a mechanical device with a touch contour element touching said C pillar to determine the width of the side frame opening in the longitudinal direction of the vehicle;
   using a positioning system, mechanically connected to said touch contour element via a lever mechanism, for changing the position of B pillar door hinges in the longitudinal direction with respect to the B pillar as a function of a deviation in dimension in the longitudinal direction of said door opening determined by touching the C pillar;
   tensioning the B pillar door hinges after said step of changing the position;
   fastening said B pillar door hinges to the B pillar after said step of tensioning; and
   attaching the door to the B pillar hinges after said step of fastening, said B pillar hinges being positioned before fastening and before attaching said doors such that at least a gap between a front door attached to the A pillar and a rear door attached to the B pillar is substantially uniform.

18. The process in accordance with claim 17, wherein a position of the B pillar hinges is displaced by half a deviation in the X direction prior to fastening a rear door to said B pillar hinges.

19. The process in accordance with claim 17, wherein the said B pillar hinges are two hinges of a door arranged one on top of another, said B pillar hinges being taken up for mounting by a common traverse, the common traverse being fastened rotatably on said positioning system and said mounting frame to bring the hinges into contact with the B pillar in a stress-free manner.

20. The process in accordance with claim 17, further comprising the step of rotating the positioned B pillar hinges, with the hinges arranged one on top of another, in an opposite direction by a corresponding, predetermined angle around a horizontal axis to compensate for door sagging caused by the weight of the door, said B pillar hinges being fastened to the B pillar subsequent to said step of rotating.

21. A motor vehicle body flexible door hinge positioning device for mounting door hinges on a side frame of a vehicle body having an opening with a front A pillar, a middle B pillar and an end C pillar, the device comprising:
   a robot actuated mounting frame, having integrated carriages displaceable in the X, Y and Z directions;
   a distance measuring mechanism for physically touching the C pillar with a touch contour element to determine the longitudinal direction dimension of the side frame opening of the vehicle;
   a positioning mechanism having a toothed rack and a lever mechanism, said distance measuring mechanism acting mechanically and directly on said positioning mechanism for mechanically correcting a measured tolerance deviation, in a longitudinal direction via a mechanical connection between said distance measuring mechanism and said toothed rack and lever mechanism, said positioning system being displaceable in the longitudinal direction on said mounting frame based on the position of said touch contour element
   a joining and tensioning device for pneumatically pressing door hinges against the said door pillars, said joining and tensioning device being arranged on said mounting frame and being displaceable with said positioning system to position the hinges along the longitudinal direction of said B pillar of the vehicle body; and
   a device for permanently fastening the door hinges to the door pillars by bolting and/or welding.

* * * * *